United States Patent [19]

Sato

[11] Patent Number: 5,245,440
[45] Date of Patent: Sep. 14, 1993

[54] METHOD AND APPARATUS FOR ADJUSTING READ START POSITION OF DOCUMENT TO BE READ

[75] Inventor: Teruyuki Sato, Kawasaki, Japan
[73] Assignee: Fujitsu Ltd., Kawasaki, Japan
[21] Appl. No.: 613,093
[22] Filed: Nov. 15, 1990
[30] Foreign Application Priority Data
Nov. 15, 1989 [JP] Japan .................. 1-296707
[51] Int. Cl.$^5$ .............................. H04N 1/00
[52] U.S. Cl. ......................... 358/406; 358/488; 358/496; 250/561
[58] Field of Search ............ 358/406, 413, 480, 494, 358/497, 444, 404, 488, 496; 250/208.1, 561

[56] References Cited

U.S. PATENT DOCUMENTS

| | | | |
|---|---|---|---|
| 4,605,970 | 8/1986 | Hawkins | 358/265 |
| 4,675,741 | 6/1987 | Shinohara | 358/480 |
| 4,686,577 | 8/1987 | Arimoto | 358/488 |
| 4,709,147 | 11/1987 | Arai | 358/494 |
| 5,138,144 | 8/1992 | Sakamoto | 358/444 |

FOREIGN PATENT DOCUMENTS

051227 5/1982 European Pat. Off. .
197734 10/1986 European Pat. Off. .
260892 3/1988 European Pat. Off. .
2523042 3/1975 Fed. Rep. of Germany .
1-115267 5/1989 Japan .

*Primary Examiner*—Edward L. Coles, Sr.
*Assistant Examiner*—Fan Lee
*Attorney, Agent, or Firm*—Staas & Halsey

[57] ABSTRACT

An apparatus for adjusting a read start position of a document to be read is provided. A read unit has at least a transportation element for transporting the document to be read. A detection switch detects a top of the document, and an optical read unit reads the document. A control unit has a memory for storing a reference read start time and a corrected read start time. A timer counts the reference read start time, and a correction unit corrects the reference read start time. The control unit corrects the reference read start time in such a way that, in a read position adjusting mode set prior to an actual read operation of the document, a test chart is inserted into the transportation element. An actual read line provided on the test chart is detected and an error is obtained between the actual read line and a reference read line provided on the test at an angle to the actual lead line is obtained. A time lag is calculated from this error and the reference read start time is corrected based on the time lag.

4 Claims, 5 Drawing Sheets

AMOUNT OF
RECEPTION
LIGHT AT CCD

POSITION

METHOD AND APPARATUS FOR ADJUSTING READ START POSITION OF DOCUMENT TO BE READ

BACKGROUND OF THE INVENTION

1. Field of the Invention

The present invention relates to a method and apparatus for adjusting a read start position of a document to be read. The present invention can be advantageously utilized for a facsimile apparatus, a copy machine, and the like.

2. Description of the Related Art

Facsimile and copy machines are widely used in various fields. In almost all of these devices, the document is automatically transported from an insertion portion of the device and is read by an optical read means mounted therein. In general, the optical read means is constituted by some basic structural elements, i.e., a light source for irradiating the document, a reflection mirror for receiving a reflected light from the document, a collection lens for collecting the reflected light, and a CCD (charge coupled device) for converting the reflected light to an electrical signal. There are, however, some mechanical installation errors caused by precision of the manufacturing process when mounting these elements that constitute the optical read means. These installation errors results in read position errors when scanning a document. Accordingly, it is necessary to precisely adjust the installation position so as not to cause mechanical installation errors.

SUMMARY OF THE INVENTION

An object of the present invention is to provide a method and apparatus which can automatically adjust a read start position of a document to be read.

In accordance with the present invention, there is provided an apparatus for adjusting the read start position of a document to be read, the apparatus including: a read unit having at least a transportation element for transporting the document to be read, a detection switch for detecting a top of the document, and an optical read unit for reading the document; and a control unit having a memory for storing a reference read start time and a corrected read start time, a timer for counting the reference read start time, and a correction unit for correcting the reference read start time; wherein the control unit corrects the reference read start time in such a way that, in a read position adjusting mode set prior to an actual read operation of the document, a test chart is inserted into the transportation element, an actual read line provided on the test chart is detected and an error between the actual read line and a reference read line provided on the test chart is obtained, a time lag is calculated from the above error and the reference read start time is corrected based on the time lag.

In one embodiment, the test chart has a cut portion provided at the center of the top of the test chart, the cut portion having a bottom reference line, and two slanted reference lines each having a predetermined angle from the top of the cut portion, the two slanted reference lines being colored black.

In another aspect of the present invention, there is provided a method for adjusting the read start position of a document to be read; the document being inserted into a read unit having at least a transportation element for transporting the document to be read, a detection switch for detecting the top of the document, and an optical read unit for reading the document; and a read operation for the document being controlled by a control unit having a memory for storing a reference read start time and a corrected read start time, a timer for counting the reference read start time, and a correction unit for correcting the reference read start time; the method including: setting a read position adjusting mode in a manufacturing process prior to an actual read operation of the document, inserting a test chart into the transportation element, detecting cross points between an actual read line and a reference read line each provided on the test chart, and obtaining an error between these lines, calculating a time lag from the above error and correcting the reference read start time based on the time lag, and storing the corrected read start time in the memory, the corrected read start time being used for detecting the read start position in a normal read operation mode after completion of the read position adjusting mode.

DESCRIPTION OF THE PREFERRED EMBODIMENTS

Before describing the preferred embodiments, an explanation will be given of mechanical installation errors and problems caused thereby in an optical read means.

Figure 1:
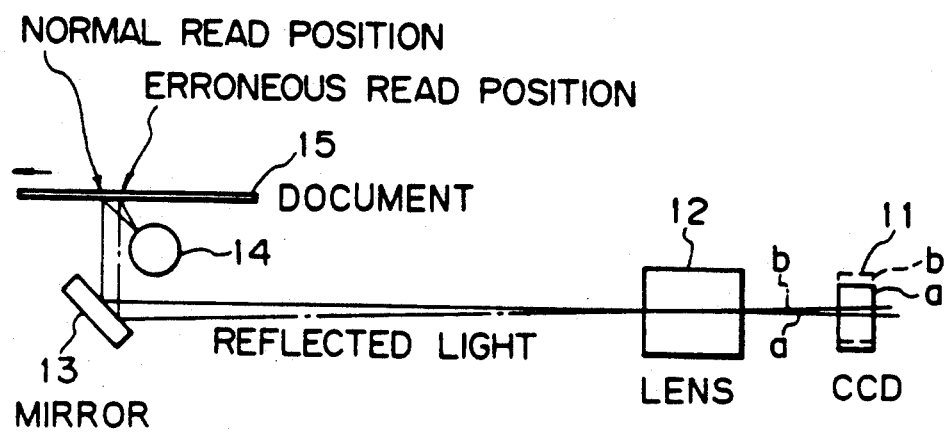
FIGS. 1 and 2 are views for explaining mechanical installation errors in an optical read means.
Figure 2:
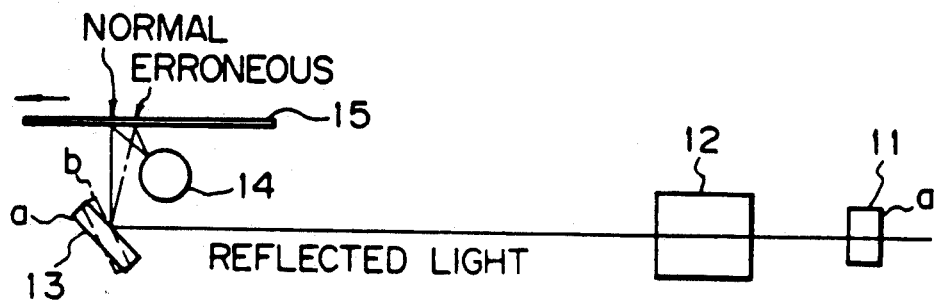

FIGS. 1 and 2 are views for explaining mechanical installation errors in an optical read means. In FIGS. 1 and 2, reference number 11 denotes a CCD (charge coupled device) for converting a reflected light to an electrical signal, 12 a collection lens for collecting the reflected light, 13 a reflection mirror for changing a light path to the collection lens, and 14 a light source for irradiating a document 15.

The document to be read is transported in a direction shown by an arrow, this transportation direction of the document 15 being called a sub-scanning direction. The light source 14 irradiates the document 15, the light reflected from the document 15 is collected by the collection lens 12 through the reflection mirror 13, and the collected light is received by the CCD 11. The CCD 11 converts the reflected light to an electrical signal in a main-scanning direction, i.e., a transversally to the transportation direction of the document 15.

In FIG. 1, when the CCD is mounted in the normal position (a), the read operation of the document 15 is started from the normal read position as shown by a solid line. However, when the CCD is erroneously mounted in the position (b), the read operation of the document 15 is started from the erroneous read position as shown by a dotted line.

In FIG. 2, when the reflection mirror 13 is mounted at the normal angle (a), the read operation of the document 15 is started from the normal read position as shown by a solid line. However, when the reflection mirror 13 is erroneously mounted at the position (b), the read operation of the document 15 is started from the erroneous read position as shown by a dotted line. Accordingly, an error in the read start position caused by the mechanical installation occurs in both cases.

Figure 3:
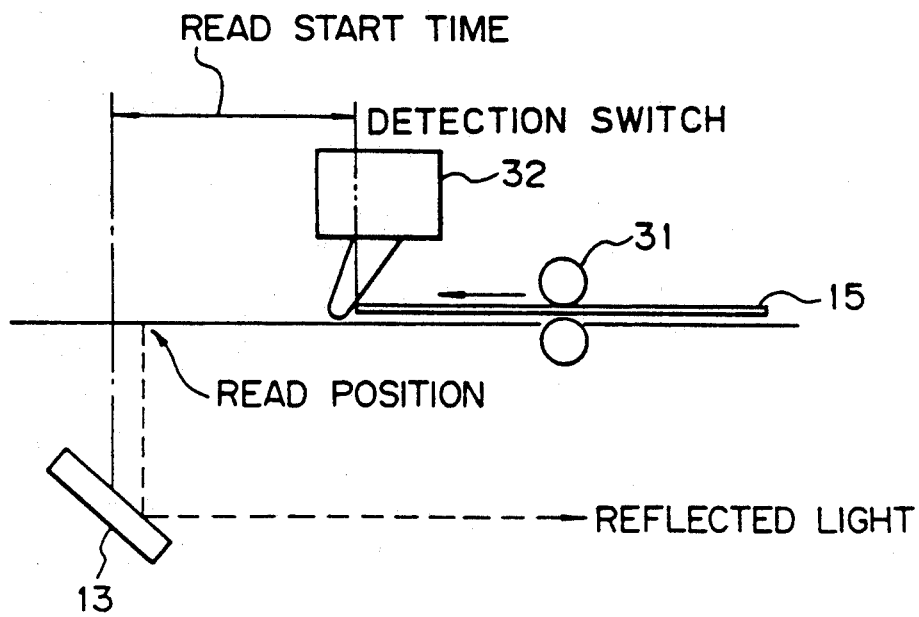
FIG. 3 is view for explaining a conventional art.

FIG. 3 is view for explaining a conventional art. In FIG. 3, reference number 31 denotes a document transportation element, and 32 a document detection switch. When the document 15 is transported by the transportation element 31 in the direction of the arrow, the detection switch 32 detects the end of the document 15.

In the conventional art, the read operation of the document 15 is started after the elapse of a predetermined time just after the detection of the document 15 by the detection element 32. That is, the time is counted after detection of the document 15, and the read operation is started after an elapse of the predetermined time. In this case, the read start time is fixedly defined based on the amount of movement of the document 15 just after the detection by the switch 32. As explained above, the read start position is defined by a fixed time in the conventional art.

Figure 4:
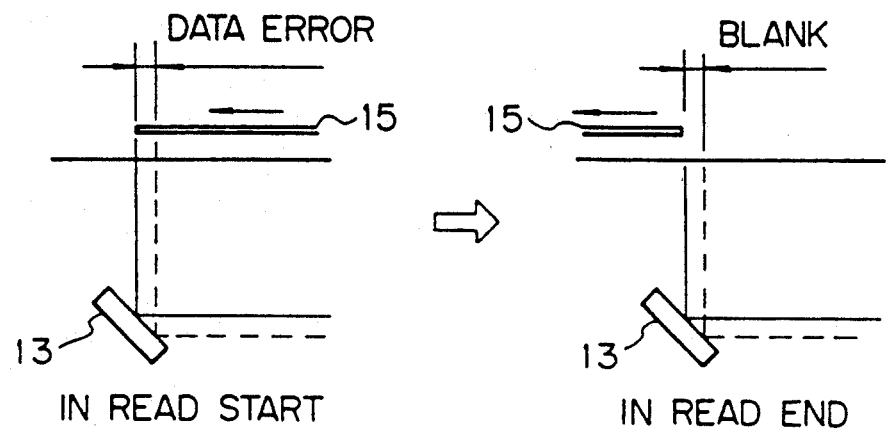
FIG. 4 is a view for explaining problems in the conventional art shown in FIG. 3.

FIG. 4 is a view for explaining problems in the conventional art shown in FIG. 3. When the mechanical installation error shown in FIGS. 1 and 2 occurs in the CCD 11 and the reflection mirror 13, a data error occurs causing the top of the document not to be read, and a blank portion at the bottom of the document occurs at the end of the read operation. As a countermeasure to the above problems, the installation positions of the CCD 11 and the reflection mirror 13 are precisely adjusted in the manufacturing process so as to obtain a correct normal read position.

In a facsimile apparatus, however, very high precision is required in the mechanical installation of the optical read means. For example, it is necessary to keep the installation error of the CCD lower than 0.1 mm in the manufacturing process. Further, it is very difficult to maintain uniform quality in the manufacturing process because of the fine adjustments required.

Figure 5:
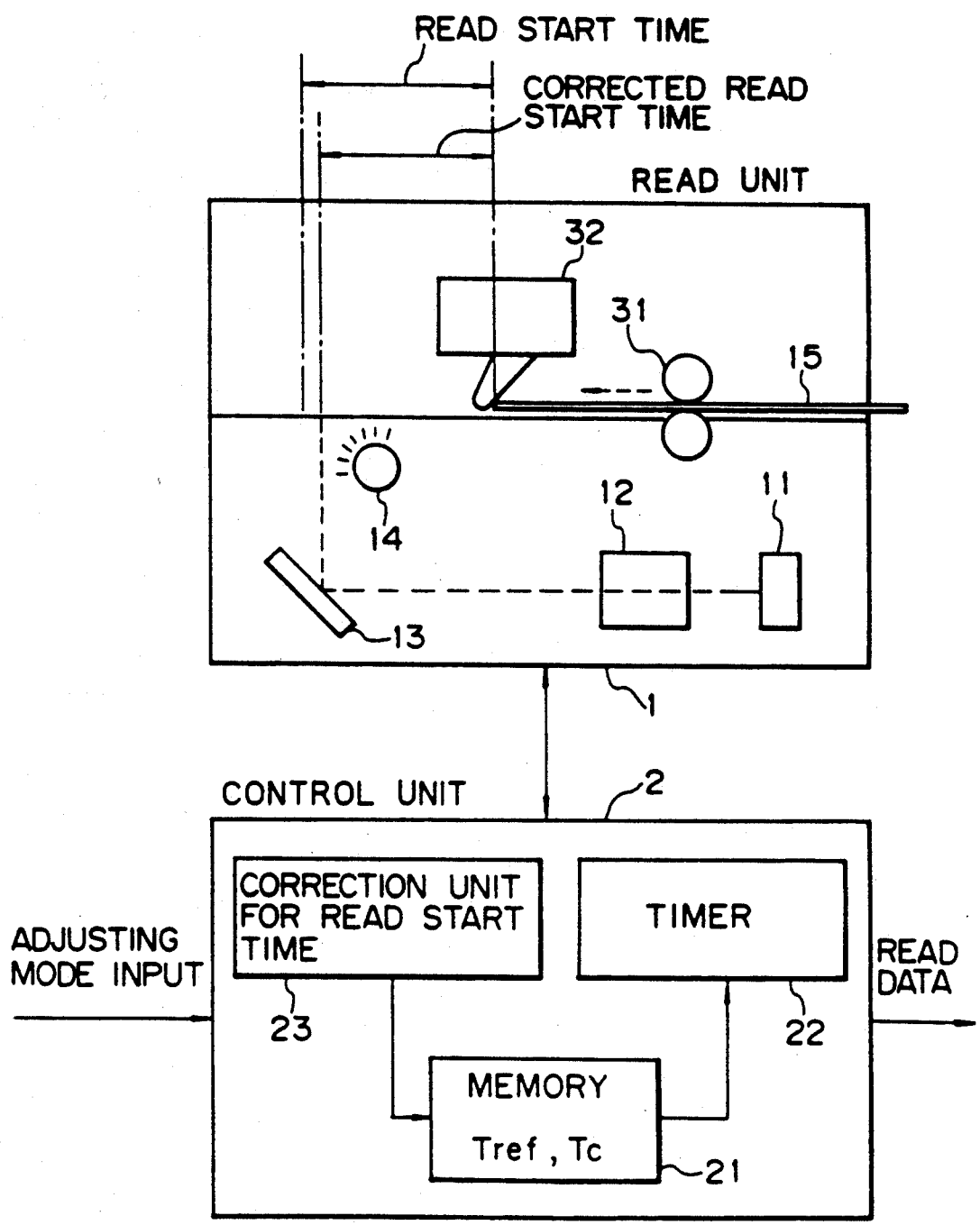
FIG. 5 is a schematic block diagram of an apparatus for adjusting a read start position according to the present invention.

FIG. 5 is a schematic block diagram of an apparatus for adjusting a read start position according to the present invention. The apparatus according to the present invention is constituted by a read unit 1 and a control unit 2. The mechanical structure of the read unit 1 is the same as the conventional one. That is, the read unit 1 is constituted by the CCD 11, the collection lens 12, the reflection mirror 13, the light source 14, the document transportation element 31 and the document detection switch 32.

In the present invention, basically, the read start time for the document is variable and is corrected by using a test chart in the read position adjusting mode prior to the actual read operation. That is, the read position adjusting mode is set in the manufacturing process or in a maintenance process of the apparatus to correct the reference read start time. In this case, the read start time is adjusted based on an error between an actual read line and a reference read line of the test chart. Accordingly, it is possible to easily coincide the read start position with the top of the document without fine mechanical adjustment of the CCD 11 and the reflection mirror 13 as explained in detail hereinafter.

Preferably, the control unit 2 is constituted by a microprocessor including a storage unit (memory) 21, a time counting unit (timer) 22 and a correction unit 23. The memory 21 stores a control program for adjusting the read start position and correcting the read start time. Further, the memory 21 stores a reference read start time and a corrected read start time as explained in detail hereinafter.

Figure 6A:
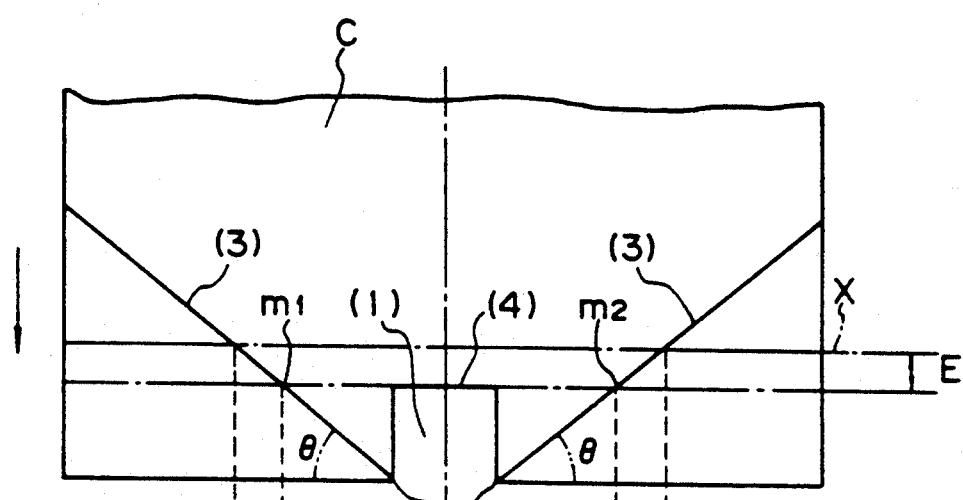
FIG. 6A is a view for explaining a test chart according to the present invention.
Figure 6B:
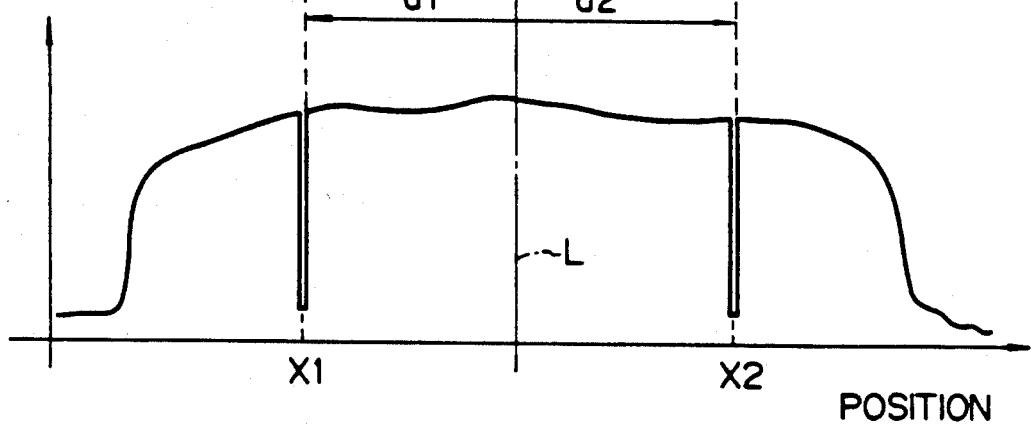
FIG. 6B is a view for explaining a relationship between an amount of reception light and a position at the CCD.

FIG. 6A is a view for explaining a test chart according to an embodiment of the present invention, and FIG. 6B is a view for explaining a relationship between an amount of the reception light and a position at the CCD.

In the FIG. 6A, the test chart C is inserted to the transportation element 31 in the direction of the arrow. As shown in the drawing, the test chart comprises a cut portion (1) in the center of the test chart C and the cut portion (1) has a bottom reference line (4). Further, the test chart comprises two slanted reference lines (3) each having an angle $\theta$ from a top point (2). These lines (3) are colored black.

When the test chart C is inserted into the transportation element 31, the bottom reference line (4) of the cut portion (1) is used as the reference read line and is detected by the detection switch 32. Accordingly, the bottom reference line (4) corresponds to the top of the document 15. The slanted reference lines (3) are used for calculating the time of the error between the bottom reference line (4) and the actual read line.

In FIG. 6B, the ordinate denotes the amount of the reception light at the CCD and the abscissa denotes the position at the CCD. For example, when the actual read line is positioned to "X", the amount of light received by the CCD is considerably reduced as shown by the points X1 and X2 because the reference read line is black so that the reflected light is reduced. In this case, since a pattern of FIG. 6B is displayed on a CRT, it is possible to detect distances a1 and a2 from a center line L of the CCD.

Further, when cross points of the bottom line (4) and the reference lines (3) are given by "m1" and "m2", respectively, the distances "b1" and "b2" between the center line L and each of cross points m1 and m2 are fixedly determined.

Accordingly, the difference between a1 and b1 and the difference between a2 and b2 represent the error E between the actual read line X and the bottom reference line (4). Further, it is possible to detect a slanting of the document based on the difference between the distance a1 and a2.

Figure 7:
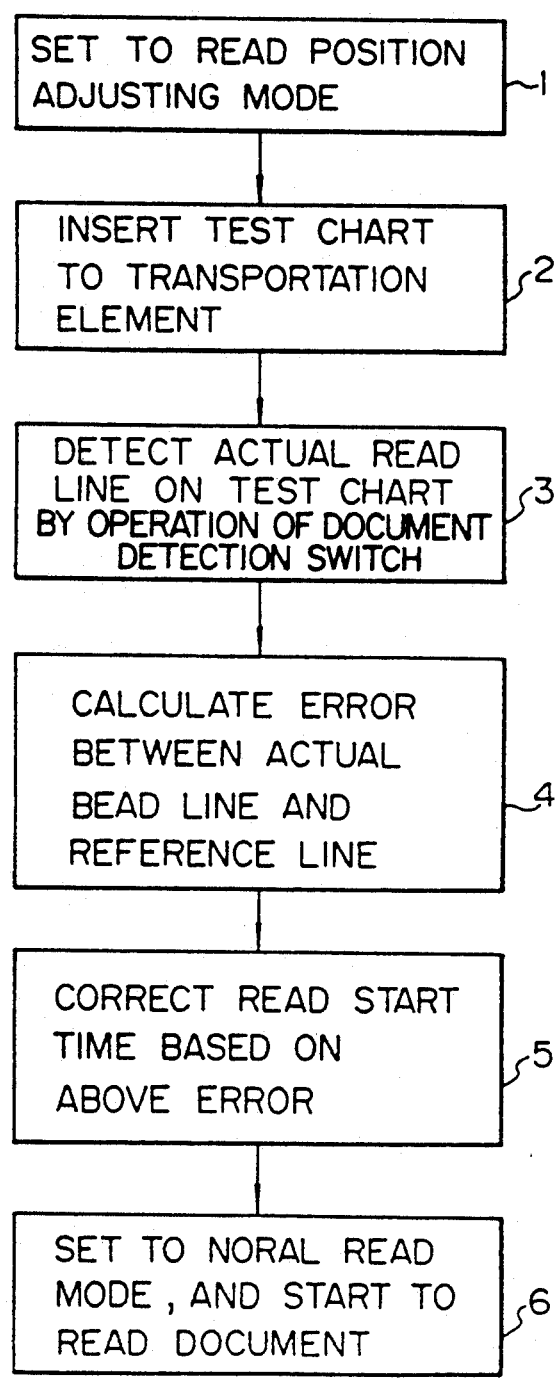
FIG. 7 is a basic flowchart according to the present invention.

FIG. 7 is a basic flowchart according to the present invention. The operation of the control unit 2 is explained in detail with respect to FIG. 7. First, the read position adjusting mode is set by an operator in the manufacturing process (step 1), and the test chart C is inserted into the transportation element 31 (step 2). As explained above, the control unit 2 is constituted by a microprocessor including the memory 21, the timer 22 and the correction unit 23. The memory 21 stores a control program for adjusting the read start position and correcting the read start time. Further, the memory 21 stores a reference read start time and a corrected read start time.

When the document detection switch 32 detects the bottom reference line (4) of the test chart C (step 3), data regarding the reference read start time is read from the memory 21, and the timer 22 starts to count the reference read start time. When the count of the reference read start time is completed, the control unit 2 starts to read the data from the CCD 11. In this case, the first one line of data is read from the CCD 11 to analyze and correct in the correction unit 23 as follows.

In steps 4 and 5, calculation and correction of errors are performed as follows.

First, the correction unit 23 detects the points X1 and X2 each indicating the cross point between the reference line (3) and the actual read line X.

Next, the correction unit 23 detects the distances a1 and a2 from the center line L.

Next, the correction unit 23 performs following calculation.

$$T1 = (b1-a1) \tan\theta \div V \quad (1)$$

$$T1 = (b1-a1) \tan\theta \div V \quad (1)$$

$$Tc = Tref \pm (T1+T2)/2 \quad (3)$$

where,

T1 and T2 are time lags, b1, b2, and $\theta$ are fixed values as previously explained, Tc is the corrected read start time, Tref is the reference read start time, and V is a transportation speed of the document.

Finally, the memory 21 stores the corrected read time Tr.

In the formulae (1) and (2), "(b1−a1) tan$\theta$" and "(b2−a2) tan$\theta$" correspond to the error E between the bottom reference line (4) and the actual read line X shown in FIG. 6A. Accordingly, the transportation time, i.e., the time lag (i.e., T1 and T2) is given by a calculation of E/V.

As shown in formula (3), total time of the error is given by a mean value. Accordingly, the corrected read time Tc can be obtained by the formula (3).

As is obvious, when there is a difference between the time T1 and the time T2, this difference represents the slanting of the document.

In step 6, when the read position adjusting mode is completed, the apparatus is changed to a normal read operation mode to read the document as explained hereinafter. That is, the operation of the control unit 2 at the normal operation mode is explained hereinafter. As explained above, this mode is performed after completion of the read position adjusting mode. In FIG. 5, when the document 15 is inserted into the transportation element 31, the document 15 is automatically transported and detected by the detection switch 32. When the detection of the document is input to the control unit 2, the corrected read start time Tc is read out from the memory 21, and the timer 22 starts to count the corrected read start time Tc. When the corrected read start time Tc is completed, at the same time, the read operation from the CCD 11 is started.

In the present invention, as explained above, the read position adjusting mode is provided in the manufacturing process of the apparatus prior to the actual read operation (i.e., normal read operation) of the document. In the read position adjusting mode, the read start time is corrected by using the test chart so as to coincide the top of the document with the read start position at the actual read operation. Accordingly, it is not necessary to precisely adjust the mechanical installation position of the CCD and the reflection mirror.

Further, although the pattern of the test chart is shown in FIG. 6A as one example, the test chart is not limited to this pattern and it is possible to provide other patterns with in the scope of the present invention.

Still further, the present invention can also be applied to a copy machine since it has the same optical read means as that of the facsimile apparatus.

I claim:

1. An apparatus for adjusting a read start position of a document to be read, said apparatus comprising:

read means having at least a transportation element for transporting the document to be read, a detection switch for detecting a top of the document, and optical read means for reading the document; and control means having storage means for storing a reference read start time and a corrected read start time, time counting means for counting the reference read start time; and correction means for correcting the reference read start time, wherein said control means corrects the reference read start time in such a way that, in a read position adjusting mode set prior to an actual read operation of the document, a test chart is inserted to the transportation element, an actual read line provided on the test chart is detected and an error between the actual read line and a reference read line provided on the test chart is obtained, a time lag is calculated from the above error and the reference read start time is corrected based on the time lag.

2. An apparatus as claimed in claim 1, wherein said test chart comprises a cut portion provided at the center of the top of the test chart, the cut portion having a bottom reference line, and two slanted reference lines each having a predetermined angle from the top of the cut portion.

3. An apparatus as claimed in claim 2, wherein said two slanted reference lines are colored black.

4. A method for adjusting a read start position of a document to be read; said document being inserted into a read means having at least a transportation element for transporting the document to be read, a detection switch for detecting a top of the document, and optical read means for reading the document; and a read option for the document being controlled by control means having storage means for storing a reference read start time and a corrected read start time, time counting means for counting the reference read start time, and correction means for correcting the reference read start time, said method comprising:

setting a read position adjusting mode in a manufacturing process prior to an actual read operation of the document, inserting a test chart into the transportation element, detecting a cross point between an actual read line provided on the test chart and a reference read line provided on the test chart at an angle to the reference read line, and obtaining an error between the actual and reference read lines, calculating a time lag from the above error and correcting the reference read start time based on the time lag, and storing the corrected read start time in the storage means, the corrected read start time being used for detecting the read start position is a normal read operation mode after completion of the read position adjusting mode.

* * * * *

UNITED STATES PATENT AND TRADEMARK OFFICE
CERTIFICATE OF CORRECTION

PATENT NO. : 5,245,440
DATED : Sep. 14, 1993
INVENTOR(S) : SATO

It is certified that error appears in the above-indentified patent and that said Letters Patent is hereby corrected as shown below:

Col. 5, line 19, the repeat of equation (1) should be deleted and replaced with equation (2), as follows:

$$\text{--}T2 = (b2 - a2)\tan\theta \div V \qquad (2)\text{--}.$$

Col. 6, line 45 (Claim 4, line 6, change "option" to --operation--.

Signed and Sealed this

Sixth Day of May, 1997

Attest:

BRUCE LEHMAN

Attesting Officer        Commissioner of Patents and Trademarks